United States Patent
Slaugh et al.

(10) Patent No.: US 6,789,217 B2
(45) Date of Patent: Sep. 7, 2004

(54) SYSTEM AND METHOD FOR ALLOCATING LOGIC ANALYZER HARDWARE RESOURCES

(75) Inventors: Chad H Slaugh, Colorado Springs, CO (US); Jeffrey John Haeffele, Monument, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 585 days.

(21) Appl. No.: 09/832,599

(22) Filed: Apr. 10, 2001

(65) Prior Publication Data

US 2002/0147943 A1 Oct. 10, 2002

(51) Int. Cl.[7] ............................................. G06F 11/00
(52) U.S. Cl. ........................................ 714/39; 714/46
(58) Field of Search .......................... 714/39, 45, 46; 712/233, 227; 717/128

(56) References Cited

U.S. PATENT DOCUMENTS

| | | | |
|---|---|---|---|
| 6,389,558 B1 * | 5/2002 | Herrmann et al. | 714/39 |
| 6,467,053 B1 * | 10/2002 | Connolly et al. | 714/39 |
| 6,615,369 B1 * | 9/2003 | Beck et al. | 714/39 |
| 6,633,838 B1 * | 10/2003 | Arimilli et al. | 703/16 |
| 6,658,557 B1 * | 12/2003 | McCoy et al. | 712/227 |
| 6,662,313 B1 * | 12/2003 | Swanson et al. | 714/39 |
| 2002/0129300 A1 * | 9/2002 | Floyd et al. | 714/39 |

* cited by examiner

Primary Examiner—Scott Baderman
Assistant Examiner—Anne L. Damiano

(57) ABSTRACT

Systems and methodologies for use in signal measurement systems that acquire and store signal data in accordance with a trigger specification. In particular, the present invention is directed to a hardware resource allocator that is interposed between the signal acquisition hardware of a logic analyzer and the user interface on which a signal measurement specification model is presented to the operator. The hardware resource allocator translates the measurement requirements as specified by the user on the user interface to commands for allocation and control of the appropriate combination of hardware resources. Generally, the hardware resource allocator allocates and configures the requisite hardware resources and translates the measurement specification to hardware control data used by software drivers to program the signal acquisition hardware resources. Importantly, the hardware resource allocator separates the logic analyzer hardware from the trace measurement specification model presented to the operator on the user interface. The hardware resource allocator translates the measurement requirements provided by the user interface model to the appropriate combinations of commands and data appropriate for the signal acquisition hardware architecture.

17 Claims, 10 Drawing Sheets

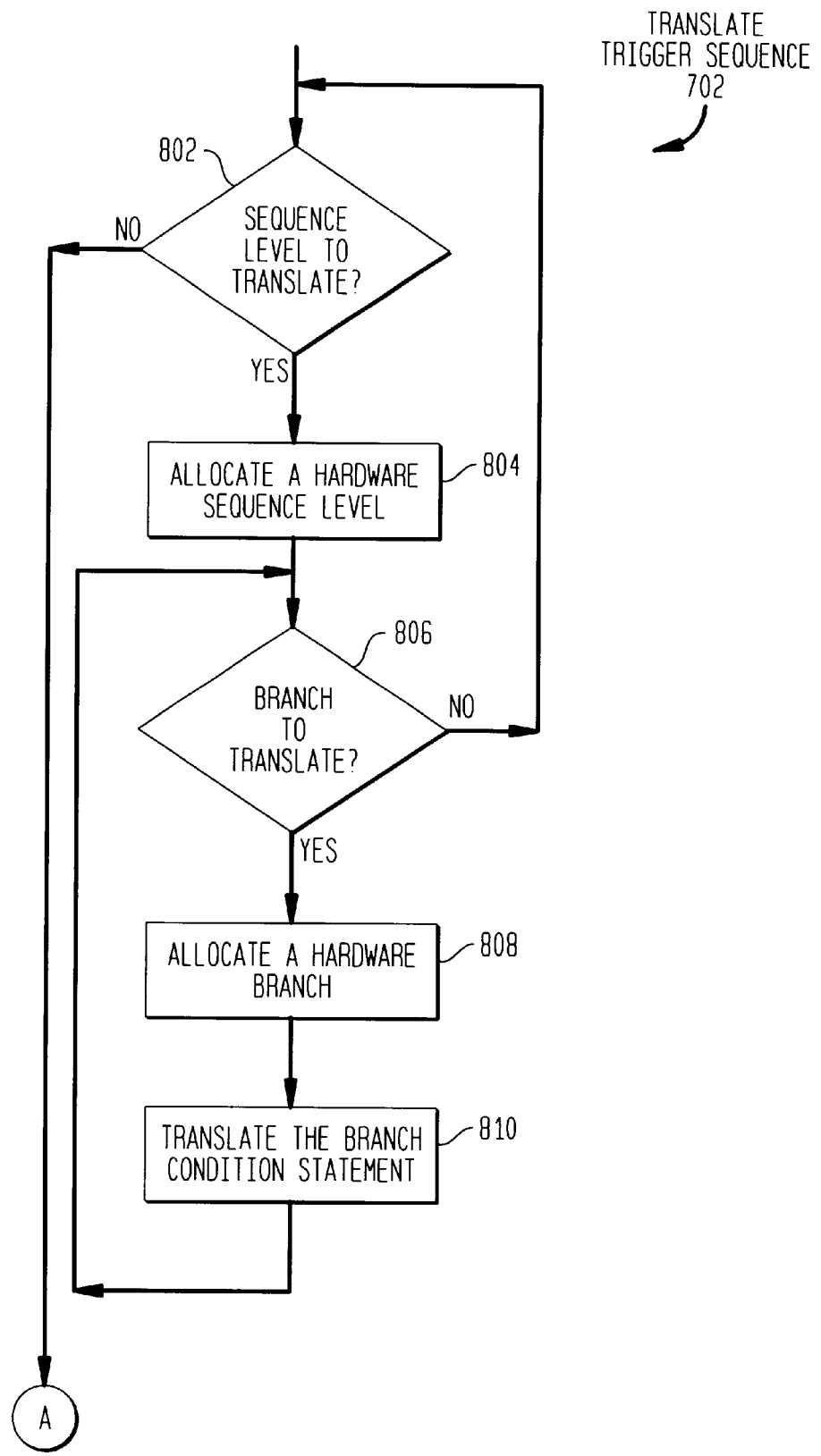

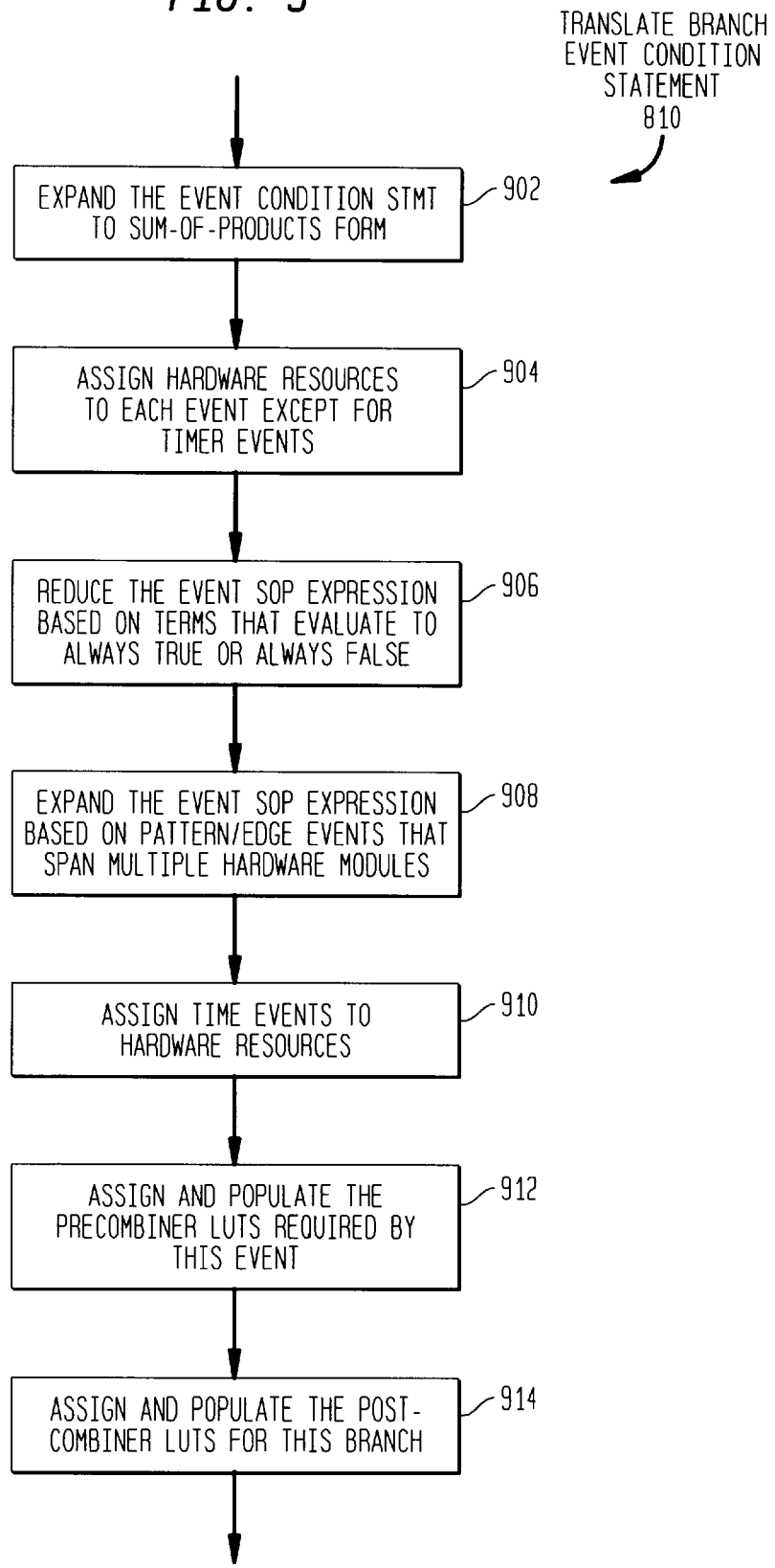

SYSTEM AND METHOD FOR ALLOCATING LOGIC ANALYZER HARDWARE RESOURCES

BACKGROUND OF THE INVENTION

1. Field of the Invention

The present invention relates generally to signal measurement systems and, more particularly, to allocating hardware resources to perform a user-specified measurement in a logic analyzer.

2. Related Art

Analyzers and testers are commonly available to assist in the development, manufacturing and troubleshooting of complex digital electronic/software devices and integrated circuits having incorporated therein microprocessors, random-access memories (RAM), read-only memories (ROM), and other circuits. Such analyzers and testers, generally referred to herein as signal measurement systems, include, for example, logic analyzers, digital oscilloscopes, protocol analyzers, microprocessor emulators, bit error rate testers and network analyzers. Logic analyzers in particular have emerged for this purpose and are commercially available from a number of vendors such as Agilent Technologies, Inc., Tektronix, Inc., and others.

Logic analyzers are digital data acquisition instruments that allow a user to acquire and display digital signal data from a large number of logic signals such as those that travel over address, data and control lines of a device under test. A device under test may include a printed wiring board, printed circuit board, including microprocessors, memory circuits and other circuits and circuit components.

The logic signals are acquired from the device under test on hardwired lines referred to as data channels. The channels may be physically assembled into groups commonly referred to as pods. The received signals are sampled and digitized to form signal data. Digitizing typically includes comparing a voltage magnitude of each logic signal sample to a reference voltage threshold to determine the logic state of the signal. Sampling may occur at one of a number of selectable rates, depending on the frequency at which the sampled signals change logic states. The resultant signal data are stored, under the control of a sampling clock, in a signal data memory generally having a fixed size. The data are typically stored in a sequential manner such that consecutive signal samples are stored in consecutive memory locations. Due to the quantity of signal data, signal data memory is commonly implemented as a wrap-around buffer.

Selection of the portion of the signal data that is separately stored and subsequently presented on the display is determined by a user-defined trigger specification, referred to herein as a trigger sequence. A trigger sequence is functionally divided into one or more sequence levels to assist in the development and definition of complex trigger specifications. Each sequence level, in turn, includes one or more trigger to branches. Each trigger branch includes one or more trigger events and an occurrence specification together identifying the condition under which functions defined by an action list of the trigger branch are performed. A trigger event is defined as an occurrence of certain characteristics or properties of a signal, such as a rising or falling edge, a logic high or logic low signal state, etc. Events may also be defined based on internal resources, such as internal timers, counters, etc. Typically, a branch condition specifies a number of events that occur simultaneously. The trigger branch condition is expressed by a Boolean expression referred to herein as a branch condition statement. Typically, the branch condition statement includes as one event an identification of the signal data that is to be captured.

Thus, a trigger sequence is comprised of one or more trigger sequence levels each including any number of trigger branches each of which includes a branch condition the occurrence of which causes the logic analyzer to execute the action defined in that trigger branch. Such execution results in the storage of signal data or further processing of a subsequent sequence level. Ultimately, execution of a trigger branch results in the storage of a predetermined quantity of signal data occurring before and after the portion of the signal that satisfied the specified trigger condition.

After the trigger specification is specified, the user can perform a measurement; that is, initiate acquisition of signal samples. When signal data capture is initiated, currently received signal data is compared to the specified trigger sequence. When the trigger sequence is satisfied, the signal data is captured in accordance with specified trigger control parameters. Subsequently, the signal data memory may be sequentially accessed and the captured signal data displayed.

Conventional logic analyzers present on a display device a measurement specification model that is nearly a direct representation of the analyzer's internal hardware architecture to be programmed by the user. The user defines the trigger sequence by programming the hardware elements of the acquisition hardware through the displayed measurement specification model. The user constructs a trigger sequence by specifying which hardware resources shall participate in each term of the trigger sequence and how the resources are to be logically combined. This low-level hardware component configuration information is stored by the user interface and used by the analyzer software drivers to program the acquisition hardware.

This low-level, hardware component programming of the logic analyzer hardware resources prevents the efficient and accurate development of signal measurement specifications. The display of the underlying hardware architecture on the user interface is difficult for a user to understand and utilize. In addition, subsequent logic analyzer designs may implement a different hardware architecture to meet different speed and functionality design goals. Presenting a direct representation of the new architecture to the operator requires the design of a new measurement specification model for display on the user interface. Also, the user will thereafter be required to learn and understand the new measurement specification model. Furthermore, it may not be possible to use the measurement specifications made using one measurement specification model on a different type of logic analyzer due to differences in the underlying hardware architecture. These drawbacks only become more prohibitive to the productive use of the logic analyzers as they increase in complexity. Thus, as logic analyzers become more advanced, the number of qualified users decreases.

What is needed, therefore, is a system and method for facilitating the allocation of logic analyzer hardware resources.

SUMMARY OF THE INVENTION

The present invention is directed to systems and methodologies for use in signal measurement systems that acquire and store signal data in accordance with a trigger specification. In particular, the present invention is directed to a hardware resource allocator that is interposed between the signal acquisition hardware and graphical user interface on which a signal measurement specification model is presented to the user. The hardware resource allocator translates the measurement requirements specified by the user on the user interface to hardware configuration commands and data for allocation and control of the appropriate combination of hardware resources. Generally, the hardware resource allocator allocates and configures the requisite hardware resources and translates the measurement specification to hardware control data used by software drivers to program the signal acquisition hardware resources. Advantageously, the hardware resource allocator separates the architecture of the logic analyzer signal acquisition hardware from the measurement specification model presented on the user interface. As a result, the measurement specification model presented by the graphical user interface is not limited or otherwise dictated by the architecture of the signal acquisition hardware. In contrast to conventional systems subject to such limitations, the user interface may provide any measurement specification model to the user that is not a representation of or otherwise dictated by the underlying hardware architecture. This also frees the hardware architecture to be optimized for speed and efficiency without having to consider the adverse impact that an increasingly complex programming model may pose to the user. A further advantage of the invention is that the same measurement specification model can be used with logic analyzers that vary in the underlying signal acquisition hardware architecture. This allows the same software to be leveraged across multiple signal measurement platforms, saving considerable cost and time associated with converting or regenerating such measurement specification models. This also saves time and cost associated with user inefficiencies related to the use of different measurement specification models.

A number of aspects of the invention are summarized below, along with different embodiments of each of the summarized aspects. It should be understood that the embodiments are not necessarily inclusive or exclusive of each other and may be combined in any manner that is non-conflicting and otherwise possible, whether they be presented in association with a same or different aspect of the invention. It should also be understood that these summarized aspects of the invention are exemplary only and are considered to be non-limiting.

In one aspect of the invention a signal measurement system is disclosed. The signal measurement system includes a signal acquisition hardware module connected to a plurality of data channels over which logic signals travel and a user interface displaying a measurement specification model through which a user can specify a trigger sequence. The signal measurement system includes a hardware resource allocator that translates trigger branch condition statements of the trigger sequence to resource control data that allocates and controls portions of the signal acquisition hardware module to acquire and store signal data in accordance with the trigger sequence.

In one embodiment, the hardware resource allocator includes a translator that generates, for each trigger branch condition statement, resource control data that allocates and programs an event resource to implement each of the events in the trigger branch condition statement. The hardware resource allocator also includes a plurality of event combiners each programmable by the translator to evaluate a programmed Boolean combination of a programmed plurality of signals generated by the allocated event resources indicating whether the event occurred. Preferably, the plurality of event combiners are implemented as RAM look-up tables (LUTs) populated by the translator with 1's and 0's to implement a programmed Boolean combination of a plurality of programmed LUT inputs.

In certain embodiments, the hardware resource allocator also includes a measurement specification data structure, reflective of the measurement specification model, that stores the trigger sequence, and a resource control data structure that models an architecture of the acquisition hardware module and which stores the resource control data.

In embodiments in which the trigger branch condition statement is a complex Boolean expression, the event combiners are interconnected in a logically hierarchical arrangement that includes a plurality of pre-combiners and a post-combiner. The pre-combiners are connected to one or more of the programmed event resources to implement a Boolean combination of event result signals generated by the connected event resources. Such pre-combiners generate a signal representing the implemented Boolean combination of event resources. The post-combiner is connected to the plurality of pre-combiners to implement a Boolean combination of received pre-combiner result signals. The post-combiner generates a signal indicating whether the branch condition statement has been evaluated as true of false for a currently-received logic signal.

In another aspect of the invention a plurality of hardware modules for use in a logic analyzer is disclosed. Each hardware module is connected to a plurality of data channels over which logic signals travel. Each hardware module includes a plurality of hardware event resources configured to determine whether a specified event has occurred; and a plurality of programmable event combiners configured to evaluate a programmed Boolean combination of a plurality of signals generated by a programmed combination of the event resources. The event combiners implement a branch condition statement of a trigger branch in a trigger sequence. The hardware modules also include an occurrence counter that determines whether said branch condition statement evaluates as true a programmed number of occurrences. An action decoder, responsive to the occurrence counter, configure to invoke the event resources to implement one or more actions in an action list of the trigger branch in the trigger sequence. The plurality of event combiners are implemented as RAM look-up tables (LUTs) populated with 1's and 0's to implement the programmed Boolean combination of a plurality of programmed LUT inputs.

In one embodiment, the event combiners are interconnected in a logically hierarchical arrangement, and comprise a plurality of pre-combiners and at least one post-combiner. The pre-combiners are connected to a programmed one or more of the event resources to implement a Boolean combination of event result signals generated by the connected event resources. The post-combiner is connected to the pre-combiners to implement a Boolean combination of received pre-combiner result signals, thereby indicating whether the branch condition statement has been evaluated as true of false for a currently-received logic signal.

In a further aspect of the invention a method for translating a branch condition statement of a trigger sequence in a logic analyzer including a plurality of hardware modules is disclosed. The hardware modules are each connected to a plurality of data channels over which logic signals travel. The hardware modules include a plurality of hardware event resources configured to determine whether a specified event has occurred, and a plurality of programmable LUT event combiners configured to evaluate a programmed Boolean combination of a plurality of signals generated by a programmed combination of hardware event resources. The event combiners implement a branch condition statement of a trigger branch in a trigger sequence. The method includes the steps of: (1) expanding the branch condition statement Boolean expression into sum-of-products form; (2) allocating a hardware event resource to implement each event in the branch condition statement; (3) reducing the branch condition statement based on events that always evaluate true or false; (4) expanding the branch condition statement based on pattern or edge events that span multiple hardware modules such that the spanning events are expanded to multiple events that contain only data channels that can be assigned within a single one of the plurality of hardware modules; and (5) populating the combiner LUTs required by each event such that combiners are implemented in a two-level hierarchical scheme with event resources generating values that are provided as inputs to pre-combiners which in turn generate outputs that are provided to a post-combiner.

Various embodiments of the present invention provide certain advantages and overcome certain drawbacks of the conventional techniques. Not all embodiments of the invention share the same advantages and those that do may not share them under all circumstances. Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a reference numeral identifies the drawing in which the reference numeral first appears.

BRIEF DESCRIPTION OF THE DRAWINGS

The present invention is pointed out with particularity in the appended claims. The above and further advantages of this invention may be better understood by referring to the following description taken in conjunction with the accompanying drawings, in which:

FIGS. 8A–8C are a flow chart illustrating the processes performed to translate trigger sequence stored in the trigger sequence region of the measurement specification data structure illustrated in FIG. 2 in accordance with one embodiment of the present invention.

FIG. 9 is a flow chart illustrating the processes performed to translate each branch event condition statement introduced in FIG. 8.

DETAILED DESCRIPTION

I. Introduction

Figure 1:
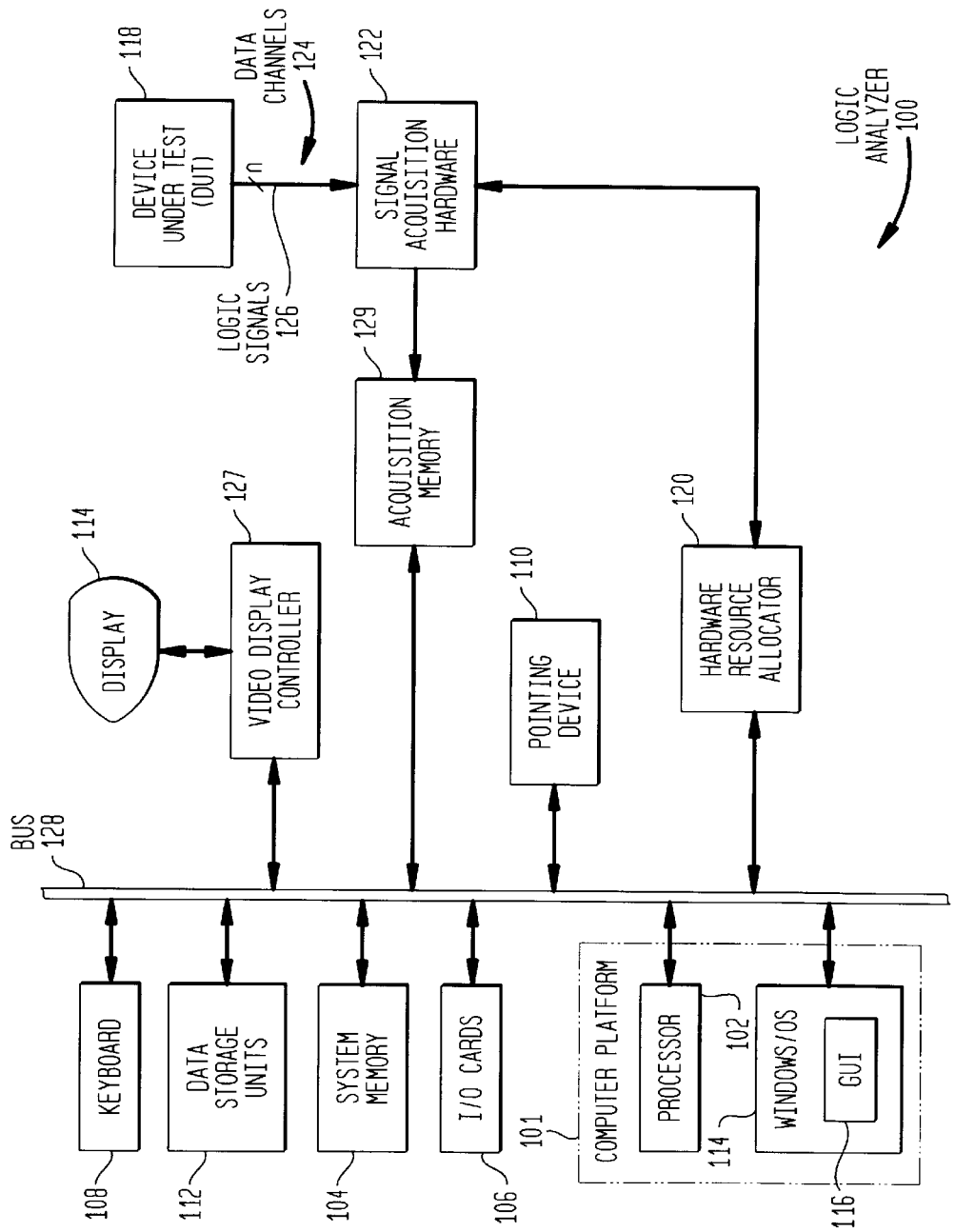
FIG. 1 is a functional block diagram of an exemplary logic analyzer in which embodiments of the present invention may be implemented.

The present invention is directed to systems and methodologies for use in signal measurement systems that acquire and store signal data in accordance with a trigger specification. Aspects of the present invention will be described with reference to exemplary signal measurement system, a logic analyzer. FIG. 1 is a functional block diagram of such a logic analyzer.

Logic analyzer 100 acquires, analyzes and displays a wide variety of signals generally in terms of the logic level of the signals versus time. In the illustrative embodiment shown in FIG. 1, logic analyzer 100 includes a general purpose computer system which is programmable using a high level computer programming language, and specially programmed, special purpose hardware for performing signal acquisition, analysis and display functions. It should become apparent from the following description that the present invention may be implemented in other environments such as a special purpose program operating on an on-board processors, ASICs, firmware, hardware, or a combination thereof.

Logic analyzer 100 includes processor 102, system memory 104, input/output (I/O) cards 106, storage units 112 such as a hard disk drive, floppy disk drive, etc. Analyzer 100 may also include one or more user input/output devices such as keyboard 108, pointing devices 110 and display 114. System memory 104 is used for storage of program instructions in addition to other computer-readable programs and data. In a preferred embodiment, system memory 104 includes random access memory (RAM). Display 114 is a cathode ray display or LCD, and is logically or physically divided into an array of picture elements (pixels). Input/output (I/O) interface cards 106 may be modem cards, network interface cards, sound cards, and the like.

Processor 102 is typically a commercially available processor, such as the PA-RISC processor from Hewlett-Packard Company, Pentium microprocessor from Intel Corporation, or PowerPC and 68000 series microprocessors from Motorola. Many other processors are also available. Such a processor executes a program referred to as an operating system 114, providing a graphical user interface (GUI) 116 and a windowing system, such as the various versions of the Windows operating systems from Microsoft Corporation or the Unix operating system available from many vendors such as Sun Microsystems, Inc., Hewlett-Packard Company and AT&T. Operating system 114 controls the execution of other computer programs such as software embodiments of the present invention, and provides scheduling, input-output control, file and data management, memory management, and communication control and related services. Processor 102 and operating system 114, generally define a computer platform shown by dashed block 101, for which application programs in high level programming languages may be written. The functional elements of logic analyzer 100 communicate with each other via system bus 128.

Signal acquisition module 122 contains circuitry and software that samples and digitizes logic signals 126 from device under test 118. Signal acquisition module 122 receives logic signals 126 from device under test 110 via data channels 124. Signal acquisition module 122 receives and digitizes periodically-obtained samples of logic signals 126. The sampling time interval may be operator-specified or synchronized with a logic signal 126 received from device under test 118, such a clock signal generated by device under test 118. The sampled and digitized representation of logic signals 126 is stored temporarily for analysis by signal acquisition module 122.

A selected portion of the sampled logic signals 126 for subsequent storage and display is determined based on an operator-defined trigger sequence. A trigger sequence is specified generally by two parameters, a trigger definition that identifies the occurrences under which signal data is to be stored, and a trigger position that identifies the relative position of the occurrence defined by the trigger definition. A predetermined quantity of signal data occurring before and after the specified occurrence is stored in acquisition memory 129.

Logic analyzer 100 also includes a video display controller 127. Computer platform 101 drives video display controller 127 using standard windows applications program interfaces (API). The trigger sequence is defined through a measurement specification model presented in graphical user interface 116.

In accordance with the present invention, logic analyzer 100 includes a hardware resource allocator 120. Hardware resource allocator 120 is interposed between signal acquisition hardware 122 and graphical user interface 116 on which a signal measurement specification model is presented to the user. Hardware resource allocator 120 translates the measurement requirements specified by the user on the user interface to hardware configuration commands and data for allocation and control of the appropriate combination of hardware resources. Generally, the hardware resource allocator allocates and configures the requisite hardware resources and translates the measurement specification to hardware control data used by software drivers to program the signal acquisition hardware resources.

Advantageously, hardware resource allocator 120 separates the architecture of the logic analyzer signal acquisition hardware 122 from the measurement specification model presented on the user interface. As a result, the measurement specification model presented by graphical user interface 116 is not limited or otherwise dictated by the architecture of signal acquisition hardware 122. In contrast to conventional systems subject to such limitations, the user interface 116 may provide any measurement specification model to the user that is not a representation of or otherwise dictated by the underlying hardware architecture. This also frees the hardware architecture to be optimized for speed and efficiency without having to consider the adverse impact that an increasingly complex programming model may pose to the user. A further advantage of the invention is that the same measurement specification model can be used with logic analyzers that vary in the underlying signal acquisition hardware architecture. This allows the same software to be leveraged across multiple signal measurement platforms, saving considerable cost and time associated with converting or regenerating such measurement specification models. This also saves time and cost associated with user inefficiencies related to the use of different measurement specification models.

II. Hardware Resource Allocator

A. High-Level Architecture

Figure 2:
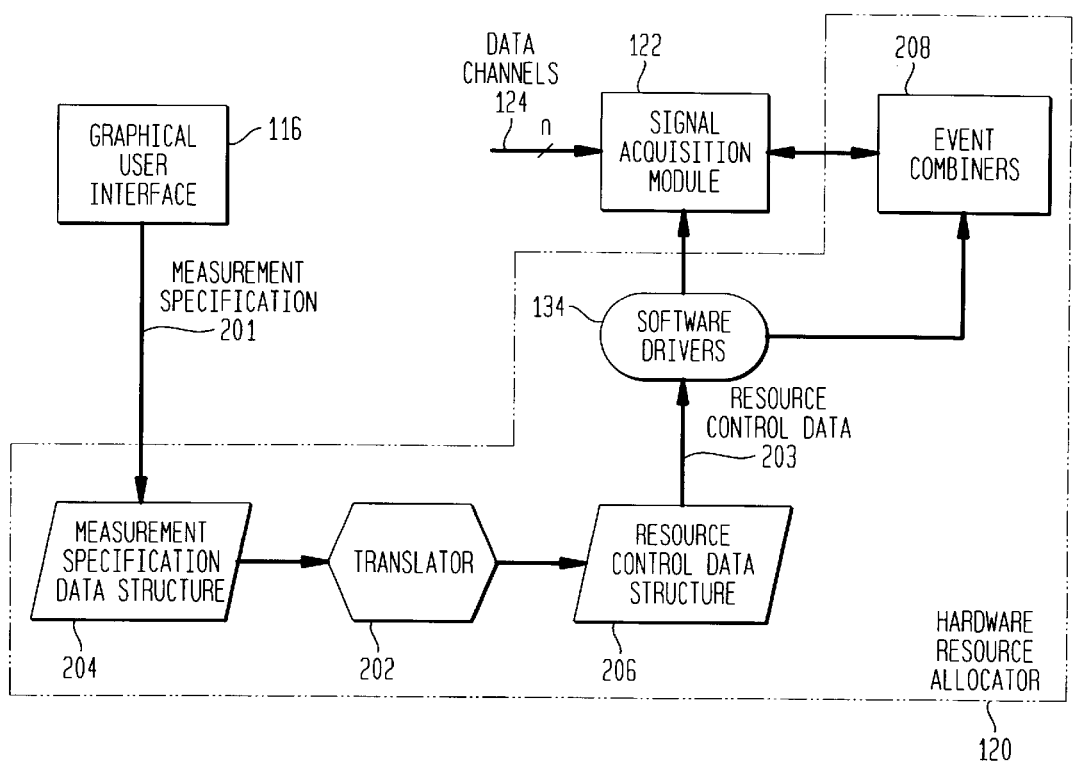
FIG. 2 is a functional block diagram of a hardware resource allocator in accordance with one embodiment of the present invention.

FIG. 2 is a functional block diagram of one embodiment of hardware resource allocator 120 of the present invention. The primary components of hardware resource allocator 120 include a translator 202 that translates measurement specifications 201 generated by graphical user interface 116 to hardware configuration data, referred to herein as resource control data 203, for allocation and control of signal acquisition hardware 122.

A measurement specification data structure 204 reflective of the implemented measurement specification model is provided in hardware resource allocator 120 to store measurement specification data 201 provided by graphical user interface 116. Translator 202 reads measurement specification data 201 from measurement specification data structure 204 and determines the hardware resource requirements of the specified trigger sequence. Translator 202 generates configuration data to allocate and program the is available hardware resources 122 as needed to implement the events identified in the branch condition statements. This information is written to a resource control data structure 206 that models the implemented hardware architecture and which is accessible to software drivers 134. Software drivers 134 retrieve resource control data 203 from data structure 206 to program signal acquisition hardware resources 122. Hardware resource allocator 120 also includes event combiners 208 programmed by translator 202 to receive the results of the signal acquisition hardware processing of the specified events. Event combiners 208 combined the event results in accordance with the Boolean logic of the trigger branch condition statements. The result of the processing by event combiners 208 results in an indication of whether the trigger branch condition has been evaluated as true or false for the currently received logic signal 126.

B. Measurement Specification Data Structure

Figure 3:
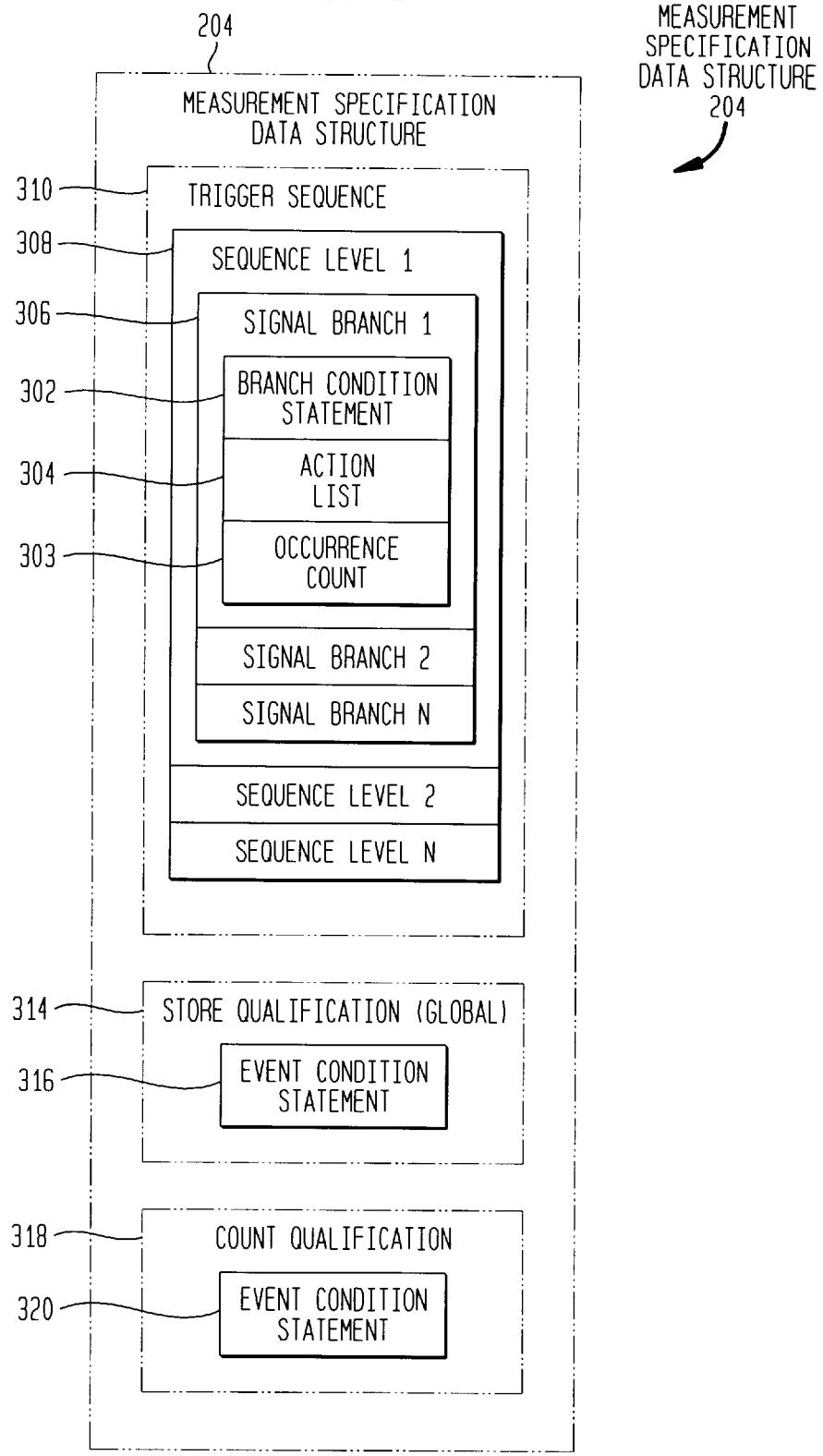
FIG. 3 is a schematic block diagram of the measurement specification data structure illustrated in FIG. 2 in accordance with certain aspects of the present invention.

As noted, graphical user interface 116 stores measurement specification data 201 in measurement specification data structure 204. FIG. 3 is a schematic block diagram of the measurement specification data structure 204 in accordance with one embodiment of the present invention. Measurement specification data structure 204 is a data structure that reflects the logical organization of a trigger sequence. Preferably, data structure 204 is implemented in an object-oriented programming language to facilitate access and retrieval of data stored in data structure 204.

As noted, each trigger branch of a trigger sequence includes one or more trigger events and an occurrence specification together identifying the condition under which functions defined by an associated action list of the trigger branch are performed. A trigger event can be an occurrence of certain characteristics or properties of a logic signal 126 or an internal resource. Typically, a branch condition includes a number of such trigger events that occur simultaneously or in a relative time sequence, and is expressed in a Boolean expression referred to above as a branch condition statement. An occurrence specification identifies the requisite number of times the trigger branch condition is to occur for the associated action list to be executed.

A measurement specification 201 includes a single trigger sequence. A trigger sequence storage area 310 is allocated in data structure 204 to store the trigger sequence data. Trigger sequence storage area 310 is divided into regions reflective of the logical structure of a trigger sequence. Trigger sequence storage area 310 contains one or more regions to store sequence levels 308. Each sequence level storage area 308 contains one or more regions in which sequence branches 306 are stored. Each branch storage region 306 contains a branch condition statement 302, an action list 304 and, optionally, an occurrence count 303.

In addition to trigger sequence storage area 310, measurement specification data structure 204 includes a store qualification storage area 314 that includes a condition statement 316 of one or more events. Similarly, a count qualification storage area 318 includes a condition statement 320 of one or more events.

Branch condition statement 302 is a user-generated expression or equation that includes one or more events. Each event evaluates to true or false on each logic signal 126 acquired by logic analyzer 100. The events of a branch condition statement 302 are logically ANDed and/or ORed together using Boolean logic; thus, branch condition statement 302 is a Boolean logic expression that includes at least one event. Branch condition statement 302 evaluates to produce a single true or false result.

The complexity of the Boolean expression is generally not limited. For example, the events can be combined in arbitrary Boolean expressions which themselves can be grouped or otherwise combined in various Boolean expressions. As will be described in detail below, when hardware resources 122 evaluate an entire branch condition statement 302 as being true, the associated action list 304 is executed by signal acquisition hardware 122.

There are many types of events that can be provided by logic analyzer 100. Six types of events that can be utilized in accordance with the present invention, for example, are pattern, timer, counter, flag, arm and anything events. Pattern events are evaluated as true when the sampled data matches the pattern specified in the event. Timer events are evaluated as true when the current timer value matches the time specified in the event. Counter events are evaluated as true when the current count value matches the count specified in the event. Flag events are evaluated as true when the flag matches the value (set or clear) specified in the event. Arm events are evaluated as true when the arm signal from another logic analyzer has been received. Finally, anything events are always evaluated as true or false.

An action list 304 is a list of actions to be executed when its associated branch condition statement 302 evaluates as true the number of times specified in the occurrence region 303. All actions in an action list 304 are executed. As with the events of branch condition statement 302, there are numerous well-known types of actions that the user can specify. Examples include "Goto<sequence level>" actions which set the current sequence level 308 to the specified sequence level 308 within trigger sequence 310. "Counter" actions control the actions of the specified counters. Counter actions include, for example, increment, decrement and reset counter actions. "Timer" actions control the actions of the specified timers. The actions include, for example, reset, pause and resume a specified timer. "Flag" actions control the actions of the specified flag. The actions include, for example, set, clear and pulse the specified flag. "Store" actions control the sample store operations. The actions include, for example, start and stop storing, store and do not store this sample, etc. "Trigger" actions control the trigger of logic analyzer 100. An occurrence count 303 is the number of times the branch condition statement 302 of the same signal branch 306 is to be evaluated as true before action list 304 is implemented.

Store qualification region 314 includes a global store qualification data. This is in contrast to the noted store actions that can be included in action list 304. Typically, store actions in an action list 304 override the store qualifications 314 that serve as a default condition for storing signal samples. There are four actions for store qualification 314: enable or disable the default store qualification, and store and do not store the signal data satisfying the store qualification. Count qualification region 318 includes a global default count qualification that determines when the satisfied events are counted.

C. Event Combiners Implemented in Hardware Modules

As noted, signal acquisition hardware 122 includes hardware components for monitoring logic signals 126 and capturing signal data in accordance with measurement specifications 201 provided by graphical user interface 116. Specifically, and in accordance with the present invention, translator 202 controls the behavior of logic analyzer signal acquisition module 122 based on a trigger sequence received from graphical user interface 116.

Figure 4:
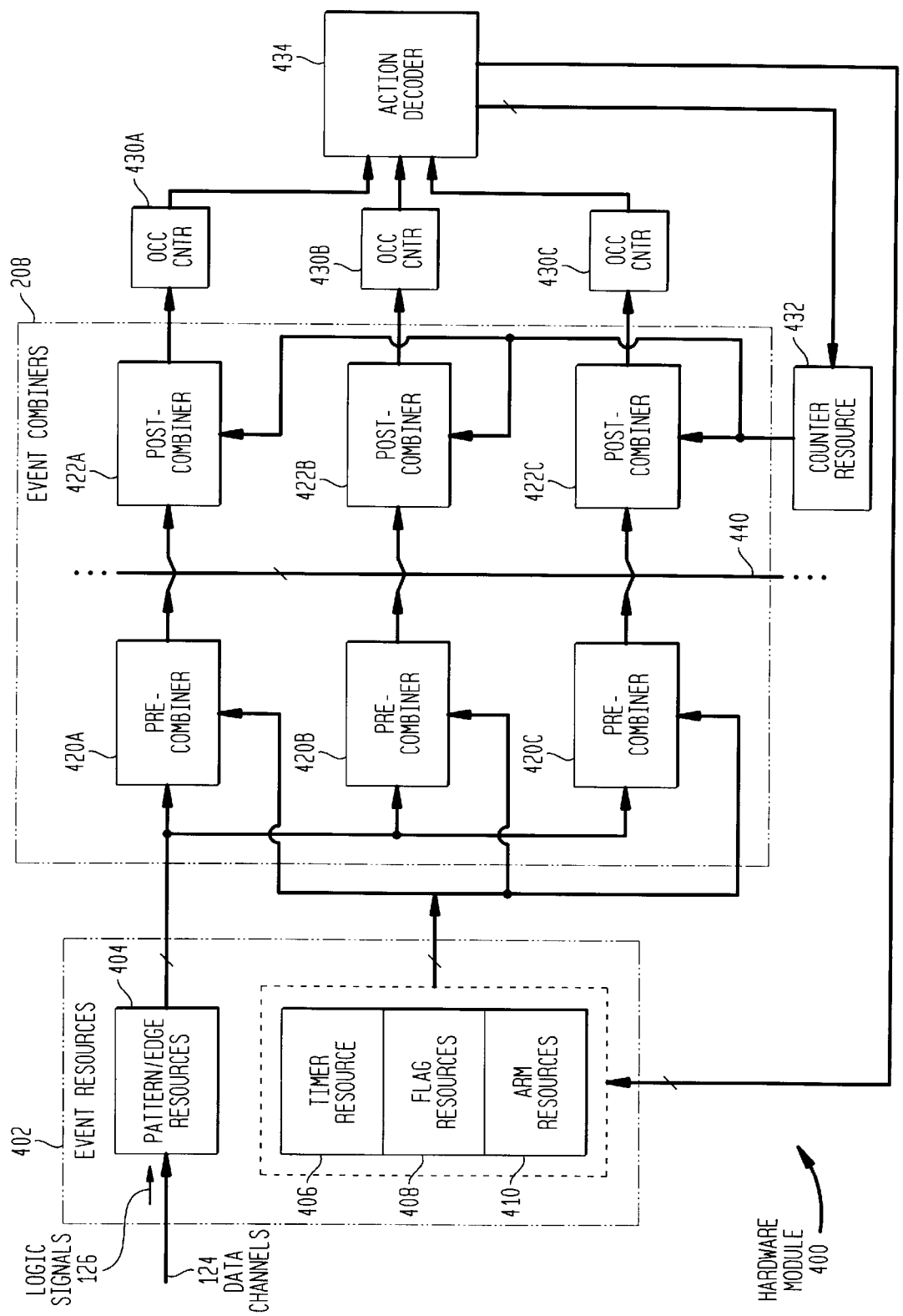
FIG. 4 is a schematic block diagram of a hardware module implementing event resources and combiners in accordance with one embodiment of the present invention.

FIG. 4 is a schematic block diagram of an exemplary embodiment of a hardware module 400 in which signal acquisition module 122 and elements of the present invention are implemented. Hardware module 400 includes hardware event resources 402 that implement trigger events and associated actions 304. Hardware event resources 402 are implemented as part of signal acquisition module 122 illustrated in FIG. 1 and receive and monitor data channels 124. In accordance with aspects of the present invention, hardware modules 400 also include programmable event combiners 208. Event combiners 208 are programmed by translator 202 to evaluate Boolean combinations of event resource results to implement branch condition statement 302. When the specified number of occurrences of branch condition statement 302 occurs, an action decoder 434 of hardware module 400 invokes in event resources 402 the associated actions specified in the same signal branch 306.

Specifically, hardware event resources 402 include pattern and edge event resources 404, timer event resources 406, counter event resources 408, flag event resources 410 and arm event resources 412. As is well known, an edge resource detects when a user-specified transition occurs in a monitored logic signal 126. Pattern resources detect when a received logic signal 126 has a specified relationship with a specified pattern, commonly referred to as a label. Timer event resources 406 include at least one timer circuit. Counter event resources 408 include one or more counter circuits. Flag event resources 410 are circuits that generate a signal when certain conditions occur. Arm event resources 412 include the circuits associated with the receipt of arm signals from external sources such as another logic analyzer. The above and other hardware event resources 402 are well known in the art and, therefore, are not described further herein.

When each event resource 402 satisfies, senses or completes the specified event, it generates a signal indicating such occurrence. These event resource outputs are provided to event combiners 208. One or more event combiners 208 are programmed by translator 202 to evaluate these event resource results to implement branch condition statement 302. Each such combiner 208 is programmed to evaluate a programmed Boolean combination of event results. The results of one or more of such programmed combinations is reflected in the generation of a single bit or flag indicating whether the implemented branch condition statement 302 has or has not occurred in connection with a currently-received logic signal 126. Referring to FIG. 4, hardware module 400 also determines the number of specified times the trigger branch condition statement evaluates true. An occurrence counter 430 receives the output of combiners 208 and counts the number of times the implemented branch condition statement 302 occurs. Occurrence counter 430 is programmed by translator 202 along with the other components of hardware module 400. When the programmed number of occurrences is detected, occurrence counter 430 generates a signal that is provided to an action decoder 434. Action decoder 434 is also programmed by translator 202 with action list 304. As noted, action list 304 includes one or more actions that are to be implemented when the specified branch condition statement 302 occurs the specified number of times. Action decoder 434 controls event resources 402 accordingly.

Referring again to FIG. 4, the details of combiners 208 will now be described. In the disclosed embodiment, event combiners 208 are implemented as RAM memory locations that are operationally used as programmable look-up tables (LUTs). The LUTs are populated by translator 202 with 1's and 0's to implement a Boolean relationship of the programmed inputs. Branch condition statement 302 is typically implemented by programming multiple LUTs, each implementing a portion of the branch condition statement Boolean expression, as described below.

Event combiners 208 are interconnected to each other and to event resources 402, such as through buses, so that the output of all event resources 402 are available, and can be connected, to any event combiner 208. As noted, event combiners 208 receive the result signals generated by event resources 402 and processes certain of the received event resource signals, determining the results of a Boolean combination of the received signals. Specifically, the inputs of each combiner 208 as well as the Boolean logic the combiner 208 implements is programmable by translator 202.

In addition, event combiners 208 can be logically interconnected in a logically hierarchical arrangement to implement nested Boolean expressions of a branch condition statement 302. In the embodiment illustrated in FIG. 4, for example, event combiners 208 are logically arranged into two logic levels processors: pre-combiners 420 and post-combiners 422. Pre-combiners 420 and post-combiners 422 are interconnected, such as through one or more buses, so that any combination and configuration of pre- and post-combiners can be implemented by translator 202. Specifically, in this illustrative embodiment, pre-combiners 404 have address lines connected to event resources 402, and perform logic operations on the results generated by selected event resources 402. Pre-combiners 420 provide the results of those Boolean operations to a post-combiner 422. Post-combiner 422 executes a Boolean expression of pre-combiner outputs to implement branch condition statement 302. The results of this latter Boolean operation is a post-combiner 422 output that indicates whether the branch condition statement 302 has been evaluated as true of false for a currently-received logic signal 126.

Figure 5:
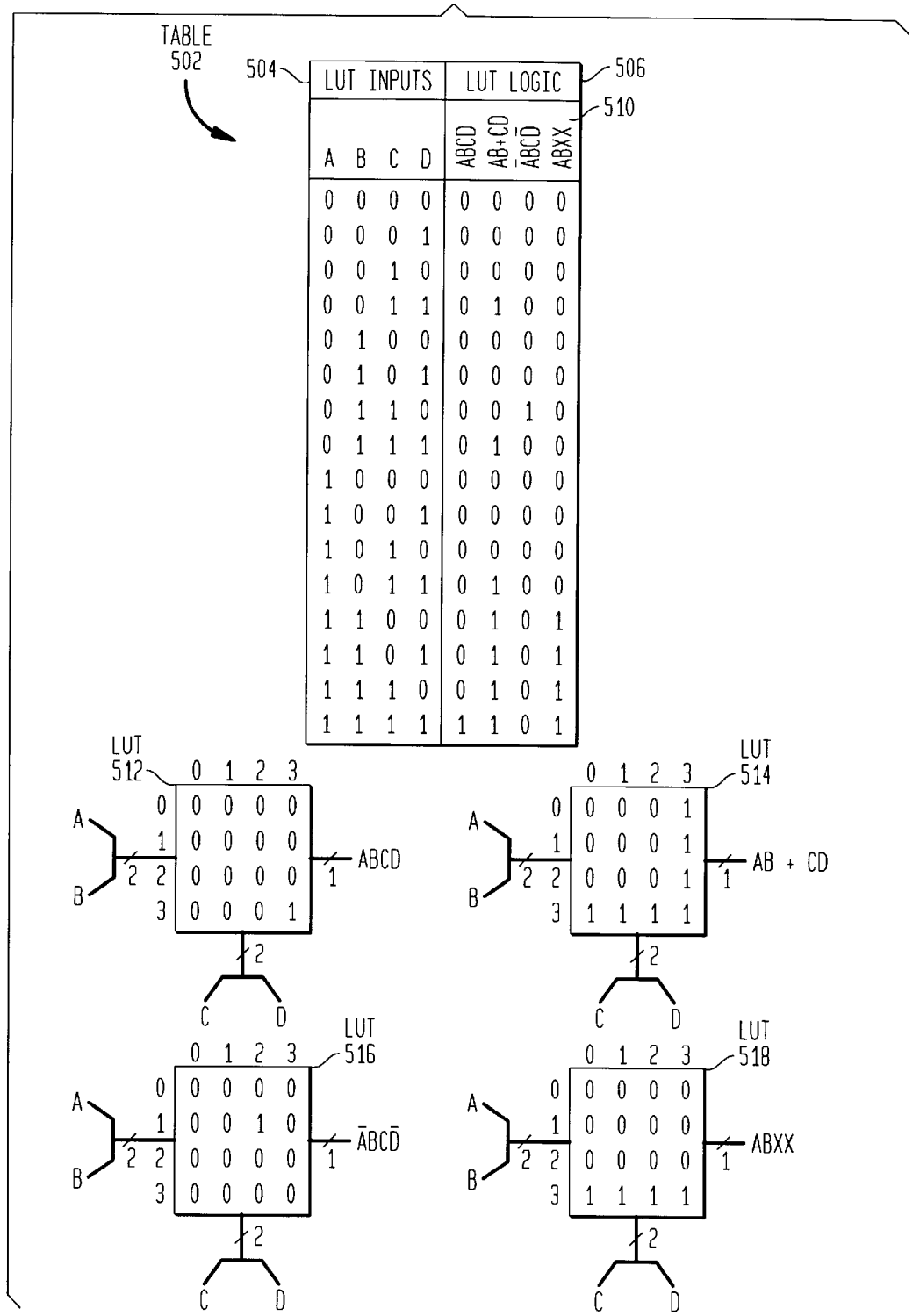
FIG. 5 is an illustration of four exemplary look-up tables (LUTs) illustrating the implementation of Boolean logic in such LUTs.

As noted, translator 202 programs each event combiner 208 by writing values to the M×N memory locations of each RAM 208. Four examples of LUT logic are illustrated in FIG. 5. In these examples, there are four address lines, and the exemplary LUTs are 4×4 RAM memory regions. The Boolean combination of two inputs, A and B, form a binary-coded address that selects the row of each LUT, while the Boolean combination of the other two inputs, C and D, form a binary-coded address that selects the column of each LUT. The combination of the row and column addresses identifies a single memory location in the LUT at the intersection of the selected row and column. The contents of this memory location is then presented at the LUT output.

Referring to table 502, the four LUT inputs 504 are provided on the left-hand side. The binary combination of the four inputs A-D from "0000" to "1111" are shown. Adjacent to each binary combination is the results of the implemented LUT logic 506. In table 502 there are four Boolean expressions 510: ABCD, AB+CD, !AB!CD and ABXX. The Boolean expressions 510 are implemented in LUTs 512–518. Specifically, Boolean expression ABCD is implemented in LUT 512, Boolean expression AB+CD is implemented in LUT 514, Boolean expression !AB!CD is implemented in LUT 516, and Boolean expression ABXX is implemented in LUT 518. In accordance with the present invention, translator 202 programs each event combiner 208 by writing the appropriate "1"s and "0"s to the combiner RAM as exemplified in FIG. 5 to implement a portion of the Boolean expression provided as branch condition statement 302.

Referring again to FIG. 4, three pre-combiners 420A–420C are connected to all event resources 402 via buses. Typically, and in the exemplary application, there are many event resources 402. For example, in one embodiment, hardware event resources 402 can include 20–40 pattern/event resources 404, 1–5 timer event resources, 10–20 flag event resources 408 and at least one arm event resource 410. In accordance with the present invention, the output port of each such event resource 404 is available to each pre-combiner 420. In this particular embodiment, pattern/edge resources 404 are connected to the row inputs of each pre-combiner 420 while timer, flag and arm resources 406, 308 and 410 are connected to the column inputs of pre-combiners 420. Other inputs arrangements are equally effective.

As noted, translator 202 selects which of the pattern/edge resources 404 and which of the other resources 406–410 are to be evaluated by a particular pre-combiner 420. That is, the address lines of each pre-combiner 420 are selectively connected to event resources 402 to receive the results of some combination of event resource results. These inputs can be provided directly or can be combined. For example, in the examples shown in FIG. 5, the inputs were combined, such as with a decoder, to arrive at a binary coded value of suitable length for addressing the row and/or column of the LUT.

Pre-combiners 420 each generate a single bit indicating whether the currently-programmed Boolean combination of the resource outputs is evaluated as true or false. This output is presented over a bus 440 and is available as an input to each post-combiner 422. Post-combiners 422 are also implemented as RAM LUTs. Boolean combinations of the pre-combiner outputs are implemented in post-combiners 422 using look-up table logic as described above. Post-combiners 422 each output a single bit indicating whether the current Boolean combination of the pre-combiner results is evaluated as true or false.

It should be appreciated that in this exemplary hierarchical arrangement, post-combiners 422 are programmed to implement Boolean logic that could not be processed by pre-combiners 420 alone. Such an arrangement would be implemented, for example, when there is a complicated Boolean expression 302 with nested Boolean terms; that is, a Boolean expression 302 that includes a number of parenthetical pairs each with one or more events related with AND and/or OR operators. Pre-combiners 420 alone could be insufficient for evaluating such complicated expressions. As such, in this disclosed embodiment, portions of event condition statement 302 is evaluated in each pre-combiner 420, and a post-combiner 422 processes the results of the pre-combiners. Thus, each branch 306 of each sequence level 308 is ultimately represented by the output of a single post-combiner 422. When the output of that post-combiner 422 is true for the requisite number of occurrences 303, the associated action controls for the branch are executed by action decoder 434.

Hardware modules 400 are individually controlled by translator 202. Translator 202 assigns the implementation of each branch condition statement 302 to one or more hardware modules 400. Since a particular hardware module 400 can be selected by the user to process a particular data channel 124, pattern/edge resources 404 must be assigned in the logic analyzer hardware module 400 that receives the corresponding data channel inputs. In addition, bus 440 is provided to other hardware modules 400. As a result, pre-combiners 420 and post-combiners 422 of different hardware modules 400 can be logically combined to implement a particular branch condition statement 302.

D. Resource Control Data Structure

As noted, the interface between translator 202 and hardware drivers 134 comprises an object-oriented data structure in which hardware resource control data 203 is stored. The resource control data 203 is written to resource control data structure 206 by translator 202 as translator 202 translates a trigger sequence stored in measurement specification data structure 204. This control data is thereafter used by software drivers 134 to program hardware modules 400.

Figure 6:
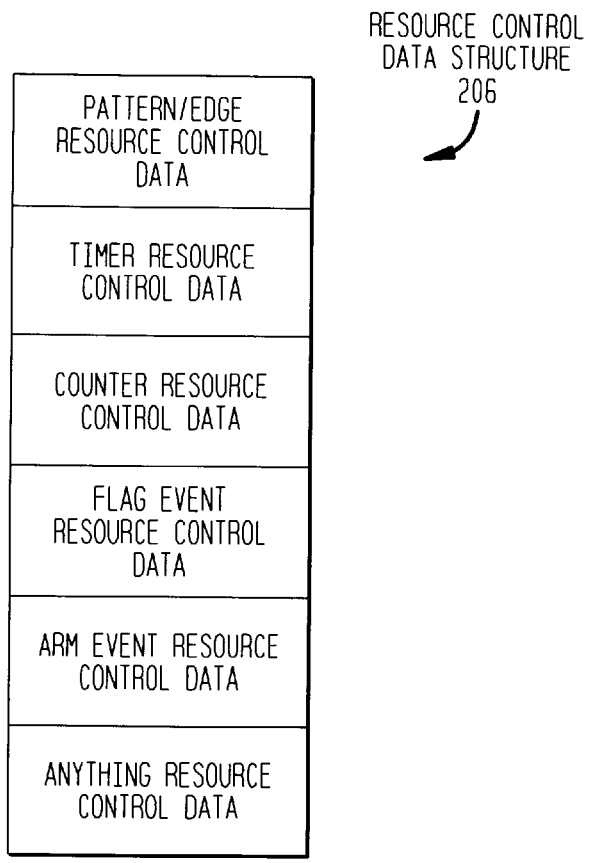
FIG. 6 is a schematic block diagram of the resource control data structure illustrated in FIG. 2 in accordance with certain aspects of the present invention.

FIG. 6 is a schematic block diagram of resource control data structure 206. Preferably, resource control data structure 206 closely resembles the actual implementation of the logic analyzer hardware 122. This facilitates the configuration of hardware resources 122 by software drivers 134. Resource control data structure 206 includes a pattern/edge resources area 602 that receives and stores pattern/edge characteristics from translator 202. Pattern/edge resources area 602 includes memory locations for each of the noted characteristics for each of the pattern/edge resources 404 in event resources 402. Similarly, timer resources area 604 receives and stores timer control data from translator 202. Timer resources area 604 includes memory locations for each of the noted control elements for each of the timer resources 406 in event resources 402.

Counter resources area 606 receives and stores counter control data from translator 202. Counter resources area 606 includes memory locations for each of the noted control elements for each of the counter resources 408 in event resources 402. Flag resources area 608 receives and stores flag control data from translator 202. Flag resources area 608 includes memory locations for each of the noted control elements for each of the flag resources 410 in event resources 402. Arm resources area 610 receives and stores arm control data from translator 202. Arm resources area 610 includes memory locations for each of the noted control elements for each of the arm resources 412 in event resources 402. Anything resources area 612 receives and stores any other resource control data 220 that may be needed to control hardware resources 122 that do not fall into any of the above categories.

E. Translator

The structure and function of hardware resource allocator 202, including translator 202, are disclosed above. Translator 202 reads measurement specification 201 stored in the measurement specification data structure 204 and populates resource control data structure 206 as it allocates and configures the available hardware resources 122 to implement the specified trigger sequence. The detail processes performed by translator 202 to implement the noted functions and operations, will now be described.

Figure 7:
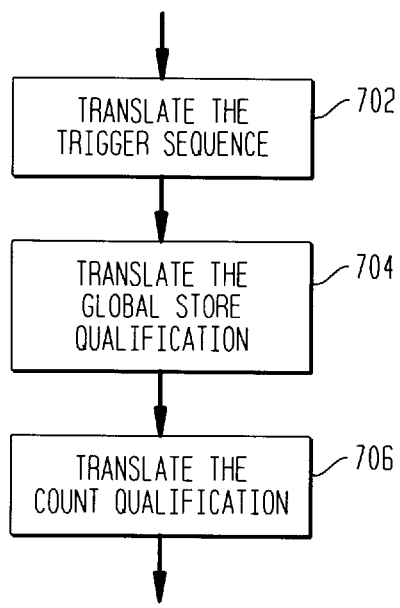
FIG. 7 is a flow chart of the primary operations performed by the translator illustrated in FIG. 2.

FIG. 7 is a high-level flow chart of the primary operations performed by translator 202. At block 702 translator 202 translates trigger sequence area 310 in measurement specification data structure 204. The translation of trigger sequence area 310 results in the population of resource control data structure 206 with hardware resource control data 203 that ultimately drives hardware resources 122 to perform the operator-specified measurement. A description of one embodiment of the operations performed by translator 202 in accordance with one embodiment of the invention is described in detail below.

At block 704 translator 202 translates global store qualification event list 316 in store qualification area 314. Similarly, at block 706 translator 202 translates event list 320 in count qualification area 318. These translations are performed using the same approach and processes as those described herein in connection with the translation of sequence area 310, the details of which are described below.

Figure 8B:
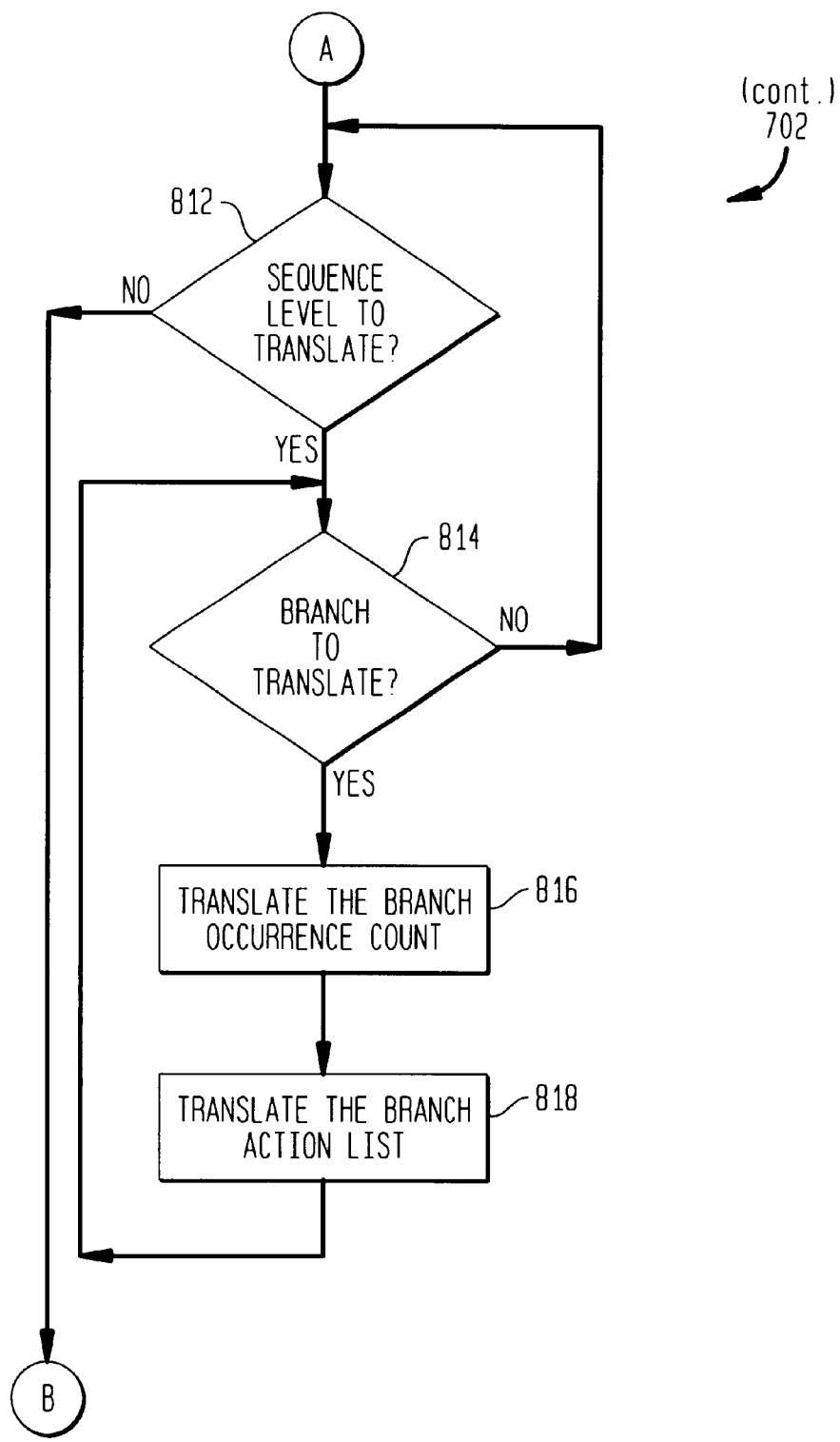
Figure 8C:
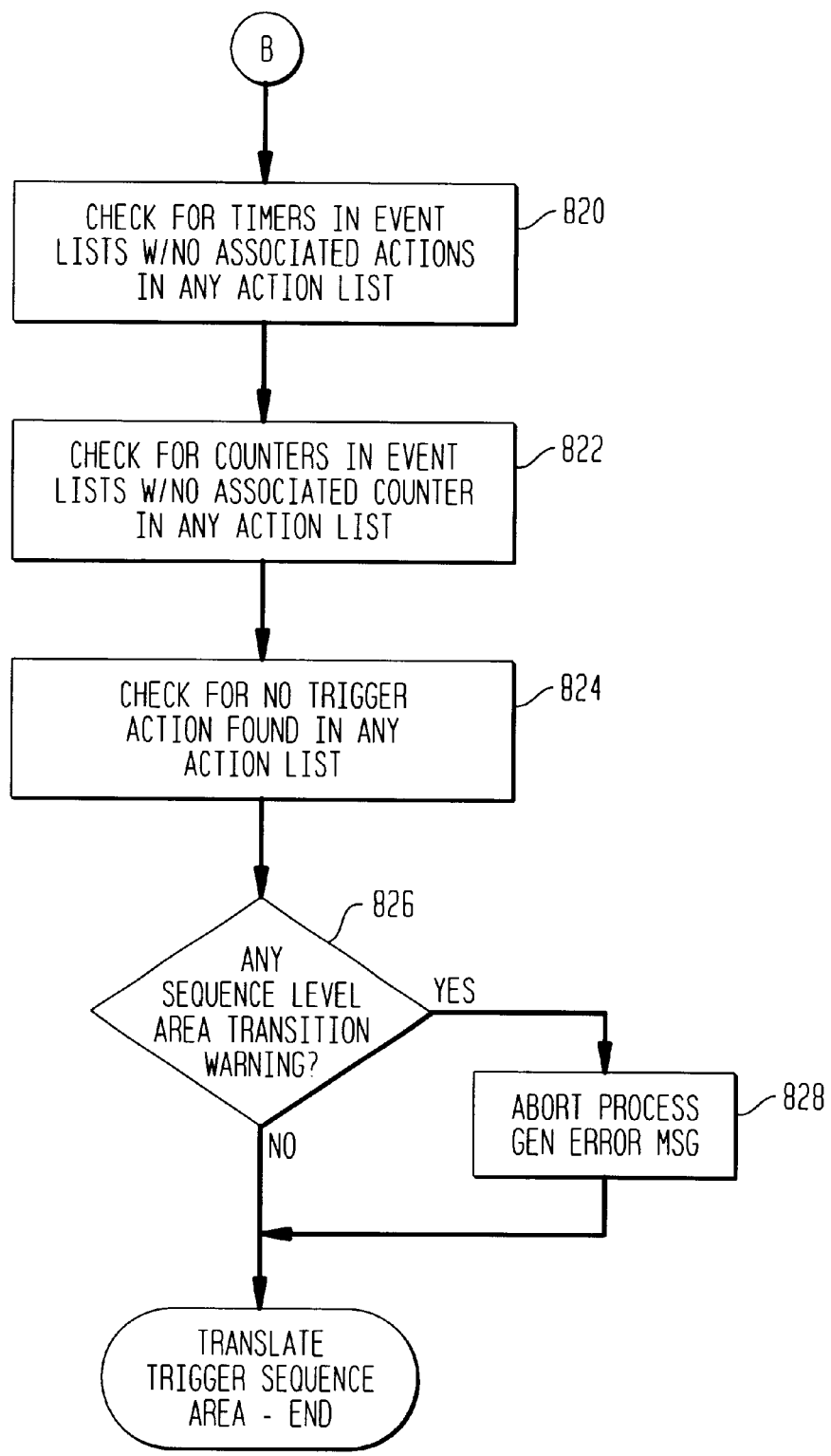

FIGS. 8A–8C together are a flow chart of the operations performed by translator 202 to translate a trigger sequence 310 in accordance with one embodiment of the present invention. This operation was introduced above with reference to block 702 of FIG. 7. At block 802 translator 202 determines whether there is any remaining trigger sequence levels 308 in trigger sequence 310 that has not yet been translated. If not, then processing continues at block 812 (through connector A; illustrated in FIG. 8B). The operations performed at block 812 are described below. If there is one or more remaining trigger sequence levels 308 in trigger sequence 310 that have not yet been translated, then processing continues to block 804.

At block 804 translator 202 allocates a hardware sequence level. Translator 202 assigns a unique hardware sequence level to each operator-specified sequence level 308. If at block 804 translator 202 determines that the number of sequence levels requested by the operator is greater than the number of hardware resources 120, an error message is printed and translator 202 aborts the operations depicted in FIGS. 7 and 8.

Processing then continues at block 806 at which translator 202 determines whether there are any remaining signal branches 306 in the currently processed trigger sequence level 308 that has not yet been translated. If there are no further signal branches 306 in the current sequence level 308 that are to be translated, then processing continues at block 802, described above. Otherwise, for each signal branch 306 in sequence level 308, translator 202 performs the operations set forth in blocks 808 and 810, described below.

At block 808, translator allocates hardware event resources 402 to a signal branch 306 currently being translated. To allocate a hardware branch 306, translator 202 assigns a unique hardware branch to each operator-specified branch. If translator 202 determines that the number of branches 306 requested by the operator is greater than the available hardware resources 120, then translator 202 generates an error message and the operations set forth in FIGS. 7 and 8 are aborted.

At block 810, branch condition statement 302 in signal branch 306 is translated. The operations performed at this block are described below with reference to FIG. 9. Once the sequence level 308 and component branches 306 have been allocated, and event lists 302 have been translated, translator 202 continues the translation of trigger sequence 310 beginning with the first sequence level 308. During this processing of sequence levels 308, translator 202 performs the operations set forth in blocks 812–818.

At block 812 translator 202 determines whether there is any remaining trigger sequence levels 308 in trigger sequence area 310 that have not yet been translated. If not, then processing continues at block 820 (through connector B; illustrated in FIG. 8C). The operations performed at block 820 are described below. If there is one or more remaining trigger sequence levels 308 in trigger sequence area 310 that has not yet been translated, then processing continues to block 814.

At block 814 translator 202 determines whether there are any remaining signal branches 306 in the currently processed trigger sequence level 308 that has not yet been translated. If there are no further signal branches 306 in the current sequence level 308 that are to be translated, then processing continues at block 812, described above. Otherwise, for each signal branch 306 in sequence level 308, translator 202 performs the operations set forth in blocks 816 and 818, described below.

At block 816, translator 202 translates occurrence count 303 in each signal branch 306. As noted, an occurrence count is the number of times the corresponding branch event list 302 must be true before the action list is executed. For each branch 306 that includes an occurrence count specification 303, translator 202 sets up a hardware occurrence counter 432. For each action specified in the action list, translator 202 initializes, at block 818, the hardware action control registers to perform the action requested in action list 304.

After all sequence levels 308 have been translated, translator 202 checks for warning conditions and posts a warning message if any are true. These include a check, performed at block 820, for timers that are contained in one or more branch condition statements 302 with no associated actions in any action list 304. At block 822 translator 202 performs a check for counters contained in one or more branch condition statement 302 with no associated counter in any action list 304. At block 824 translator 202 checks for no trigger action that captures signal data found in any action list 304. If any of these conditions are detected, as determined at block 826, an error message is generated at block 828 prior to the completion of the process.

As noted, at step 810 branch condition statement 302 is translated; that is branch condition statement 302 is converted into programming data that result in the allocation and control of hardware modules 400 to implement branch condition statement 302. FIG. 9 is a flow chart of the operations performed by translator 202 to translate branch condition statement 302 in accordance with one embodiment of the present invention. Measurement specification data structure 204 contains a branch condition statement 322 for each sequence level branch 306 of trigger sequence 310.

At block 902, translator 202 expands Boolean expression 302 into sum-of-products form. Associated with each event in branch condition statement 302 is an associated Boolean operator and a parenthetical pair identifier that specifies the relative position in branch condition statement 302 of opening and corresponding closing parentheses. Translator 202 uses the associated Boolean operators (AND and OR) and branch condition statement parenthetical pairs to expand Boolean expression 302 into sum-of-products form. Sum-of-products is a well-known Boolean expression form in which terms that contain only AND operations are referred to as product terms. The ORing of product terms is referred to as summing the product terms. It should be noted that at block 902, translator 202 expands branch condition statement 302 directly; that is, condition statement 302 is neither expanded to maximum terms nor is reduced to minimum terms. For example, an event list 302 of A(B+C)(D+E) is expanded to the form ABD+ABE+ACE.

At block 904, translator 202 allocates a hardware event resource 402 to implement each event in branch condition statement 302. Counter events 618, flag events 620 and arm events 622 map directly to corresponding hardware event resources 406, 408 and 412, respectively. Timer event 616 assignment is postponed until after all pattern and edge events 614 are assigned.

Translator 202 uses the label, pattern, and Boolean operator information specified in measurement specification data structure 204 and combines it with the label channel assignment information from graphical user interface 116 to allocate and populate the hardware pattern resource maps in the appropriate analyzer modules 400.

As is well known, an edge event allows the user to specie that an event is true when a low-to-high transition occurs on any channel or subset of channels or if any transition (either low-to-high or high-to-low) has occurred. The user generates these specifications on user interface 116. At graphical user interface 116 the user also specifies pattern events, commonly in terms of labels. A pattern event specifies a pattern to match the data being sampled by the data channel inputs 124. A pattern event can specify values for and an all bits in the label. The event can be specified as true if the sampled data matches the pattern (=), does not match the pattern (!=), is less than (<), less than or equal (<=), greater than (>), greater than or equal (>=), is within a range of minimum and maximum values or is not within a specified range. Since a particular hardware module 400 can be selected by the user to process a particular data channel, pattern and edge resources 404 must be assigned in the logic analyzer hardware module 400 that contains the corresponding data channel inputs.

During this hardware assignment process, translator 202 obtains information about hardware resources 400 and, with that information and the noted information about the expanded branch condition statement 302, translator 202 further modifies branch condition statement 322. For example, translator 202 implements pattern events that contain a range operator as two pattern events. The first pattern event is "greater than or equal to the lower range pattern" while the second pattern event is "less-than-or-equal to the upper range pattern". These two pattern equivalent events are AND'd together with a product term.

Also, certain pattern events evaluate to always true or always false. For example, the pattern event "if label1= XXXX" means if the bits in label 1 equal a pattern of "don't cares", the pattern event will always be true. To save hardware pattern resources 404, translator 202 replaces these types of events with "anything" events. Conversely, a pattern event of the form "if label1 !=XXXX" always evaluates false and is replaced with a "not anything" event.

If more pattern or edge events are specified in user interface 116 than are available in event resources 402, an error message is printed to user interface 116 and the translation operation aborts.

After events have been assigned to hardware event resources 402, branch list expression 302 is reduced based on terms of the expression; that is, events, that evaluate to always true to always false. Typically, user interface 116 provides the user with the capability of specifying such events directly; that is, "if anything" always evaluates true while "if not anything" always evaluates as false. At block 906, translator 202 replaces pattern events that evaluate to always true or always false with such terms or events to reduce the complexity and length of the sum-of-product term expression.

Specifically, when a product term contains an always false event, the product term is removed from the sum-of-products expression, unless it is the only product term, in which case the product term is replaced with a single "not anything" event. When a product term contains an always true event, the event is removed from the product term. If the always true event is the only event in the product term the product term is removed from the sum-of-products expression unless it is the only product term in the expression, in which case the product term is replaced with a single anything event.

As noted, logic analyzer 100 includes multiple hardware modules 400 each connected to incoming data channels 124. One such hardware module 400 was described above with reference to FIG. 4. Pattern events can be specified in graphical user interface 116 that span multiple modules 400. At block 908 translator 202 expands s branch condition statement 302 based on pattern or edge events that span multiple hardware modules 400. Specifically, translator 202 searches branch condition statement 302 for such pattern events and expands them to multiple pattern events that contain only data channels 124 that can be assigned within a single hardware module 400. The new events are inserted in event condition statement 302 in place of the original pattern event and combined together with the appropriate Boolean operators. For example, if label1 spans two analyzer modules, the event "if label1=1234" will be expanded to two events: "if label1(upper)=12" and label1(lower)=34."

Recall that timer events have yet to be assigned. At block 910, translator 202 assigns hardware timer resources 406 to timer events included in branch condition statement 302. Each hardware module 400 contains at least one timer device. It is advantageous to assign pre-combiners 420 to use timer resource 406 in the same hardware module 400 that contains the pattern event resources 404 for branch condition statement 302. Translator 202 searches branch condition statement 302 and tries to assign timer resources 406 in the same hardware module 400 as pattern resources 404. If a timer resource 406 in the desired hardware module 400 has been previously allocated to other timer events, then translator 202 continues searching until an unused timer resource 406 is found. If more timer events are specified in user interface 116 that are available in the event resources 402, an error message is printed and the translation aborts.

At block 912 translator 202 assigns and populates the pre-combiner LUTs required by each event. In accordance with the disclosed embodiment of the invention shown in FIG. 4, combiners 208 are implemented in a two-level hierarchical scheme. Hardware event resources 402 generate values that are provided as inputs to a first set of combiners, pre-combiners 420, which in turn generate outputs that feed into a second set of combiners, post-combiners 422. In the series of operations performed at block 912, translator 202 implements as LUT logic the sum-of-products form of event condition statement 302 in pre-combiners 420.

Pre-combiners 420 in the allocated hardware resources 400 are allocated first. A product term from branch list condition statement 302 can be implemented in a single pre-combiner 420 if all event resources 402 in the product term have been allocated within the same hardware module 400 and the number of events 322 in the product term does not exceed the number of inputs for the pre-combiner LUT. If event resources 402 in a product term exceed the number of inputs available in a single pre-combiner 420, then additional pre-combiners 420 are allocated and the product term is divided into parts that will fit into each pre-combiner 420. On the other hand, if an entire product term is implemented within a single pre-combiner 420, translator 202 searches the sum-of-products event expression 302 for additional product terms, if any, that can be implemented with the same pre-combiner 420 without overflow.

Also, if hardware event resources 402 in the product term have not been allocated within the same hardware module 400, a separate pre-combiner 420 must be allocated and populated in each hardware module 400 that has events. Conversely, each pre-combiner 420 can also implement multiple product terms if they do not exceed the maximum number of LUT input lines of that pre-combiner.

Translator 202 specifies the bit pattern to be loaded in pre-combiners 420 by generating sets of masking data pairs for each output bit of each pre-combiner 420. These masking pairs contain a product term "level mask" and a product term "care mask". The care mask specifies which pre-combiner inputs are involved in the product term. The level mask specifies whether these inputs must be true or false for the implemented product term to be true. Translator 202 generates these masking term pairs by evaluating the sum-of-products form of event condition statement 302. A representative Boolean value is determined based on these set-up masking terms and the corresponding bit is provided to driver 134 to be loaded in the pre-combiner LUT. A one is loaded in each position where the product term is true and a zero is loaded in all other locations.

Preferably, after each pre-combiner 420 has been allocated and populated, it is compared to the previously allocated pre-combiners 420. If there is a pre-combiner 420 already allocated that implements the identical logic as the current product term, the current product term is discarded (unallocated), and the previously-allocated product term is used in its place. This provides for an optimization in the number of pre-combiners required.

The pre-combiner LUTs 420 cannot evaluate the same event both true and false within the same product term. If during pre-combiner allocation such a product term is found (that is, A and !A), the entire product term is replaced with an "always false not anything" term and a warning message is printed. If the number of pre-combiners 420 required to implement branch condition statement 302 exceeds the number of available pre-combiners 420, an error message is printed and the translation operation aborts.

During the above operations, translator 202 generates an intermediate table that identifies each pre-combiner and its Boolean relationship with the other allocated pre-combiners 402. This table is used subsequently to allocate post-combiners 422. As pre-combiners 420 are allocated above, their outputs are added to the pre-combiner Boolean expression as a product term in the expression or list. This table is, in essence, a "pre-combiner Boolean expression" in which pre-combiner outputs are presented in a sum-of-product form.

At block 914 translator 202 assigns and populates post-combiner LUTs for this branch 306. Post-combiner LUTs 422 implement the sum-of-products pre-combiner table noted above in a similar fashion to the pre-combiner allocation described above with reference to block 912. As noted, the inputs to post-combiners 422 include the pre-combiner outputs and an output generated by a counter resource 432. A list of the product term pairs is created for each post-combiner LUT 422 output bit.

If the number of pre-combiner outputs to be combined exceed the number of post-combiner LUT inputs available in the hardware, an error message is printed and the translator aborts.

IV. Closing

While various embodiments of the present invention have been described above, it should be understood that they have been presented by way of example only, and not limitation. For example, exemplary aspects of the present invention have been described in relation to a logic analyzer. It should be apparent to those of ordinary skill in the art that the present invention may be implemented in any signal measurement system that acquires and stores signal data in accordance with a trigger specification. For example, the present invention may be implemented in a digital oscilloscope, protocol analyzer, microprocessor emulator, bit error rate tester, network analyzer, etc. It should also be understood that the flow charts provide just one exemplary implementation of the invention. In alternative embodiments, the described functions may be implemented as individual, interrupt-driven functions in, for example, the C++ programming language. It should also be understood that certain operations disclosed above need not be performed in a single device or module such as translator 202, but may be distributed across more than one component or module. For example, in one embodiment, software drivers 134 receive the noted masking data for each LUT 420, 424 and generates the bits to populate the LUTs based on the mask data. It should also be appreciated that the above description of the translation of trigger sequence 310 is also performed to translate store qualification and count qualifications 314, 316. Thus, the breadth and the scope of the present invention are not limited by any of the above exemplary embodiments, but are defined only in accordance with the following claims and their equivalents.

What is claimed is:

1. A signal measurement system comprising:

a signal acquisition hardware module having a hardware architecture and being connected to a plurality of data channels over which logic signals travel;

a user interface displaying a measurement specification model through which a user can specify a trigger sequence, wherein said measurement specification model is independent of and does not represent said signal acquisition hardware architecture; and a hardware resource allocator for translating trigger branch condition statements of said trigger sequence to resource control data that allocates and controls portions of said signal acquisition hardware module to acquire and store signal data in accordance with said trigger sequence.

2. The signal measurement system of claim 1, wherein said hardware resource allocator comprises:

a translator that generates, for each said trigger branch condition statement, resource control data that allocate and program an event resource to implement each said event of said trigger branch condition statement; and a plurality of event combiners each programmable by said translator to evaluate a programmed Boolean combination of a programmed plurality of signals generated by said allocated event resources indicating whether said event occurred to implement said trigger branch condition statement.

3. The signal measurement system of claim 2, wherein said plurality of event combiners are implemented as RAM look-up tables (LUTs) populated by said translator with 1's and 0's to implement a programmed Boolean combination of a plurality of programmed LUT inputs.

4. The signal measurement system of claim 3, wherein said event combiners are interconnected in a logically hierarchical arrangement comprising:

a plurality of pre-combiners connected to a programmed one or more of said event resources to implement a Boolean combination of event result signals generated by said connected event resources, and to generate a signal representing said Boolean combination of event resources; and a post-combiner connected to said plurality of pre-combiners to implement a Boolean combination of received pre-combiner result signals, thereby indicating whether said branch condition statement has been evaluated as true of false for a currently-received logic signal.

5. The signal measurement system of claim 3, wherein said hardware event resources comprises:

at least one edge event resource that detects when a user-specified transition occurs in the monitored logic signal; and at least one pattern event resource that detects when the monitored logic signal has a specified relationship with a specified bit pattern.

6. The signal measurement system of claim 5, wherein said signal measurement hardware module further comprises:

an occurrence counter that determines when a branch condition statement evaluates as true the number of times specified by said occurrence count, and an action decoder that invokes said event resources to implement actions in an associated action list of said trigger branch.

7. The signal measurement system of claim 2, wherein said hardware resource allocator further comprises:

a measurement specification data structure, reflective of said measurement specification model, that stores said trigger sequence; and a resource control data structure that models an architecture of said acquisition hardware module and which stores said resource control data.

8. The signal measurement system of claim 7, wherein said measurement specification data structure is a data structure that reflects the logical organization of a trigger sequence.

9. The signal measurement system of claim 7, wherein said measurement specification data structure comprises a trigger sequence storage area to store data representing said trigger sequence, wherein said trigger sequence storage area is divided into one or more sequence level storage regions each divided into one or more sequence branch storage regions in which a branch condition statement, an action list and an occurrence count are stored.

10. The signal measurement system of claim 9, wherein said measurement specification data structure further comprises a store qualification storage area that includes a condition statement of one or more events; and a count qualification storage area includes a condition statement of one or more events.

11. The signal measurement system of claim 9, wherein said signal measurement system is a logic analyzer.

12. A plurality of hardware modules for use in a logic analyzer, each said hardware module connected to a plurality of data channels over which logic signals travel, comprising:

a plurality of hardware event resources each configured to determine whether a specified event has occurred;

a plurality of programmable event combiners operatively connected to each other and to each of the plurality of hardware event resources, configured to evaluate a programmed Boolean combination of a plurality of signals generated by a programmed combination of said plurality of hardware event resources, said event combiners implementing a branch condition statement of a trigger branch in a trigger sequence;

an occurrence counter that determines whether said branch condition statement evaluates as being true for a programmed number of occurrences, and an action decoder, responsive to said occurrence counter, configure to invoke said event resources to implement one or more actions in an action list of said trigger branch in said trigger sequence.

13. The hardware modules of claim 12, wherein said plurality of event combiners are implemented as RAM look-up tables (LUTs) populated with 1's and 0's to implement said programmed Boolean combination of a plurality of programmed LUT inputs.

14. The hardware modules of claim 13, wherein said event combiners are interconnected in a logically hierarchical arrangement comprising:

a plurality of pre-combiners connected to a programmed one or more of said event resources to implement a Boolean combination of event result signals generated by said connected event resources, and to generate a signal representing said Boolean combination of event resources; and a post-combiner connected to said plurality of pre-combiners to implement a Boolean combination of received pre-combiner result signals, thereby indicating whether said branch condition statement has been evaluated as true of false for a currently-received logic signal.

15. The hardware modules of claim 13, wherein said hardware event resources comprises:

at least one edge event resource that detects when a user-specified transition occurs in the monitored logic.

16. The hardware modules of claim 13, wherein said hardware event resources comprises:

at least one pattern event resource that detects when the monitored logic signal has a specified relationship with a specified bit pattern.

17. A method for translating a branch condition statement of a trigger sequence in a logic analyzer including a plurality of hardware modules each connected to a plurality of data channels over which logic signals travel, the hardware modules including a plurality of hardware event resources configured to determine whether a specified event has occurred, and a plurality of programmable look-up table (LUT) event combiners configured to evaluate a programmed Boolean combination of a plurality of signals generated by a programmed combination of said plurality of hardware event resources, said event combiners implementing a branch condition statement of a trigger branch in a trigger sequence, the method comprising the steps of:

expanding said branch condition statement Boolean expression into sum-of-products form;

allocating a hardware event resource to implement each event in said branch condition statement;

reducing said branch condition statement based on events that always evaluate true or false;

expanding said branch condition statement based on pattern or edge events that span multiple hardware modules such that said spanning events are expanded to multiple events that contain only data channels that can be assigned within a single one of the plurality of hardware modules; and populating the combiner LUTs required by each event such that combiners are implemented in a two-level hierarchical scheme with event resources generating values that are provided as inputs to pre-combiners which in turn generate outputs that are provided to a post-combiner.

* * * * *

UNITED STATES PATENT AND TRADEMARK OFFICE
CERTIFICATE OF CORRECTION

PATENT NO.     : 6,789,217 B2
DATED          : September 7, 2004
INVENTOR(S)    : Chad H. Slaugh and Jeffrey John Haeffele It is certified that error appears in the above-identified patent and that said Letters Patent is hereby corrected as shown below:

Column 16,
Line 1, after "user to," delete "specie" and insert -- specify --

Signed and Sealed this

Eighth Day of February, 2005

JON W. DUDAS
*Director of the United States Patent and Trademark Office*